United States Patent [19]
Prasad

[11] Patent Number: 5,528,900
[45] Date of Patent: Jun. 25, 1996

[54] INSTANT AUTOMOBILE COOLING SYSTEM

[76] Inventor: Mukesh Prasad, 155 Sherman Rd., Chestnut Hill, Mass. 02167

[21] Appl. No.: 496,338

[22] Filed: Jun. 29, 1995

Related U.S. Application Data

[63] Continuation-in-part of Ser. No. 252,193, Jun. 1, 1994, abandoned.

[51] Int. Cl.$^6$ ............................ F25B 7/00; F25B 25/00
[52] U.S. Cl. .............................. 62/175; 62/244; 62/332
[58] Field of Search .............................. 62/332, 86, 401, 62/244, 172, 175

[56] References Cited

U.S. PATENT DOCUMENTS

| 794,462 | 7/1905 | Masters | 62/172 |
| 2,038,347 | 4/1936 | Cornell, Jr. | 62/87 |
| 2,078,295 | 4/1937 | Thatcher | 62/87 X |
| 4,175,398 | 11/1979 | Edwards | 62/172 |

OTHER PUBLICATIONS

*Automotive Air Conditioning*, by William H. Crouse, Magraw Hill, New York, New York, 1983, pp. 31–57.
*Chilton's 1973 Auto Air Conditioning Manual*, published by Chilton Company, Philadelphia, PA, 1973, pp. 2, 3, 11, and part of 43.

Primary Examiner—William E. Wayner
Attorney, Agent, or Firm—Edward W. Porter

[57] ABSTRACT

An automotive vehicle has an air compressor; a compressed tank for storing air compressed by the compressor; and a system for selectively releasing compressed air from the tank into the vehicle's passenger compartment to cool it. Preferably the vehicle includes a ventilation system and the compressed air is released into the ventilation system's air passageways. If the vehicle include a traditional air conditioning system using the evaporation of refrigerant to cool air, the release of compressed air can be used to provide cooling until a sensor indicates the traditional air conditioning system is capable of providing sufficient cooling. Preferably a radiator is located in the line between the air compressor and the compressed air tank to transfer heat away from the compressed air before it is stored in the tank. It is also preferred that controls in the vehicle's passenger compartment enable a passenger to control the release of the compressed air. Preferably the air compressor is turned on and off as a function of the pressure in the air tank, so the pressure in the tank tends to stay above a certain level. In some embodiments a plurality of compressed air tanks are provided with can separately have compressed air supplied to, or released from, them. Preferably the release of compressed air can be automatically stopped when a sensor detects that air temperature has dropped below a given level.

11 Claims, 3 Drawing Sheets

INSTANT AUTOMOBILE COOLING SYSTEM

RELATED APPLICATION

This application is a continuation-in-part of U.S. Patent application Ser. No. 08/252,193 filed by the present inventor, Mukesh Prasad, on Jun., 1, 1994 now abandoned.

FIELD OF THE INVENTION

The invention relates to ventilation and temperature control systems for automotive vehicles.

BACKGROUND OF THE INVENTION

Most commonly used automotive vehicles include ventilation and temperature control systems. These systems commonly provide circulation for the air in the vehicle's passenger compartment to make the air less stuffy. They commonly enable a selectable amount of air from the outside to be blown into the passenger compartment to provide cool or fresh air. They usually include a heater to enable the air in the passenger compartment to be heated. In addition, in many automotive vehicles they include air conditioning which enables the air in the passenger compartment to be cooled and dried.

In many automotive ventilation systems a grill runs along the vehicle's cowling parallel to, and just in front of, the base of the windshield. When the vehicle moves, air pressure tends to build up in front of the windshield, causing air to be blown into this grill. This air is channeled into the vehicle's ventilation system which is commonly located under its dashboard. Commonly an electric fan is provided to increase the flow of air. This is particularly useful when the vehicle is moving too slowly for air to be blown into the ventilation system with much force.

The ventilation system normally contains a heat core, which is a radiator through which part of the cooling fluid which exits the vehicle's internal combustion engine passes once it has passed through the engine and absorbed waste heat from it. The heated cooling fluid which passes through the heat core transfers a portion of its heat to the air of the ventilation system which passes through the heat core.

Normally the ventilation system includes doors, or air valves, which control the flow of air in it. Traditionally some such air valves (often in the form of passenger adjustable louvers) help control how much air flows through each of the ventilation system's various vents into the passenger compartment. Other air valves control what percent of the air entering the passenger compartment passes through the heat core, controlling the extent to which that air is heated.

Heat core heaters are efficient because they use what would otherwise be the wasted thermal energy generated by their vehicle's internal combustion engine to heat the passenger compartment. Unfortunately, it often takes several minutes after the internal combustion engine has been turned on before the engine's coolant fluid is hot enough to provide large amounts of heat to the passenger compartments. In cold weather this delay in the provision of heat to the passenger compartment can be uncomfortable and unpleasant.

In many automotive vehicles the ventilation system also includes air conditioning. Traditional automotive air conditioning systems use a refrigerant fluid which evaporates at a relatively low temperature. They include an evaporator in which the refrigerant is evaporated at low pressure to remove heat from air to be cooled. They have a compressor to convert the low pressure evaporated refrigerant gas from the evaporator into a hotter, higher pressure gas. A condenser, which looks something like a radiator, cools the hot, high pressure refrigerant gas from the compressor and condenses it into a high pressure liquid. This high pressure liquid is stored in a fluid reservoir, and a portion of it is released through a pressure reduction valve into the evaporator, so that the liquid refrigerant which enters the evaporator is of a sufficiently low pressure that it will evaporate at the temperature of the air to be cooled.

Such traditional automotive air conditioning systems work quite well, but they have the drawback that it usually takes some time before they can provide a sufficient volume of cool air into the passenger compartment to properly cool that compartment. This is a particular problem in hot climates or on hot day in any climate. It can be a particular problem when a parked car has been left in the sun on a hot day and its interior has reached a high temperature.

SUMMARY OF THE INVENTION

It is an object of the present invention to provide an automotive vehicle which can cool its passenger compartment.

It is another object of the present invention to provide an automotive vehicle which can cool its passenger compartment more quickly than vehicles using traditional automotive air conditioners.

It is another object of the present invention to provide an automotive vehicle which includes a traditional automotive air conditioner, but which can cool its passenger compartment more quickly than can vehicles using just such traditional air conditioners by themselves.

According to the present invention an automotive vehicle is provided which includes, among other things, a passenger compartment, an air compressor; a system for powering the air compressor; a compressed air tank for storing air compressed by the air compressor; and a system for selectively releasing compressed air from the tank into the passenger compartment to cool it. Such cooling results because when compressed air is released, its pressure drops to atmospheric pressure, and such a pressure drop causes it to become cool.

Preferably the vehicle further includes a ventilation system including air passageways and a fan for blowing air through the air passageways into the passenger compartment and the compressed air is selectively released into the ventilation system's air passageways.

In many embodiments of the invention the automotive vehicle will also include a traditional air conditioning system using a refrigerant which is evaporated to cool air in the ventilation system In such embodiments it is preferred that a sensor be provided for determining when the air conditioning system is capable of performing a certain degree of cooling; and that a system be provided for automatically shutting of the release of compressed air when the sensor indicates the air conditioning system's evaporator is capable of providing that degree of cooling.

Preferably a radiator device having thermally conductive fins is located in a conduit between the air compressor and the compressed air tank to facilitate the transfer of heat away from the compressed air after it is compressed and before it enters the compressed air tank. It is also preferred that human operable controls be located in the passenger compartment to enable a passenger to selectively cause the release of the compressed air.

It is also preferred that a sensor be provided for detecting the air pressure in the compressed air tank and a system be provided for turning the air compressor on and off as a function of the air pressure detected by the sensor. In some embodiments a plurality of compressed air tanks are provided with can separately have compressed air supplied to them or released from them so as to enable one tank to be charged up while another is being used.

Preferably a sensor detects air temperature and a system stops the release of compressed air when the sensor detects air temperature below a given level.

In some embodiments of the invention the air compressor is powered by electrical energy from the battery. In others it is powered by the automotive vehicle's motor, such as by a belt driven by the motor.

BRIEF DESCRIPTION OF THE DRAWINGS

These and other aspects of the present invention will become more evident upon reading the following description of the preferred embodiment in conjunction with the accompanying drawings, in which.

DETAILED DESCRIPTION OF THE INVENTION

Almost instantaneous heating within the passenger compartment of an automotive vehicle can be achieved by (i) using a device to generate microwaves, (ii) using a suitable "heating medium" which can be quickely heated by the microwaves, and (iii) using the heat of the heating medium to heat up air which is being sent into the passenger compartment. Once the vehicle's engine becomes hot, the heating medium is no longer necessary, though it may still be used. If a suitably powerful microwave generating device is used, and with the proper heating medium, the effect can be of almost instantaneous heat in the vehicle.

It is not necessary that the air actually come in contact with the heating medium. For example, where the heating medium is a liquid, the air can be made to pass through tubes (or another suitable topology which can soak-up heat quickly) immersed within the heating medium. Such tubes should be made of very good conductors of heat.

Care should be taken to make sure the microwave radiation cannot leak into the vehicle's interior, since without proper safeguards, it is possible for such radiation to damage the occupants of the car. It should also not be possible for the heating medium to explode and/or leak and damage the occupants of the vehicle.

Almost instant cooling of the passenger compartment of an automotive vehicle can be achieved by supplying a small tank filled with compressed air in the vehicle. When cooling is desired, this compressed air is released into the passenger compartment. Ideally, the location of the release of this air, and the location of vents, should be such that this compressed air displaces air already in the passenger compartment.

As compressed air expands, it cools. Therefore the net effect will be to fill the passenger compartment with cool air. Even if the hot air already in the compartment is not completely expelled, the car will be significantly cooled. From this point on, normal air conditioning can take over the cooling function.

The cooling system should be able to compressed air so compressed air is available when needed. This can be achieved simply by diverting a small amount of engine power. While the engine is running, it will also drive an air compressor, which will fill up the compressed air tank for next use. The automobile's battery may also be used in filling up the compressed air tank. One or more "backup" tanks can also be used, in order to have the system work more smoothly. The manufacturer should ensure that it is not possible for an explosion of the air tank to hurt the passengers.

Figure 1:
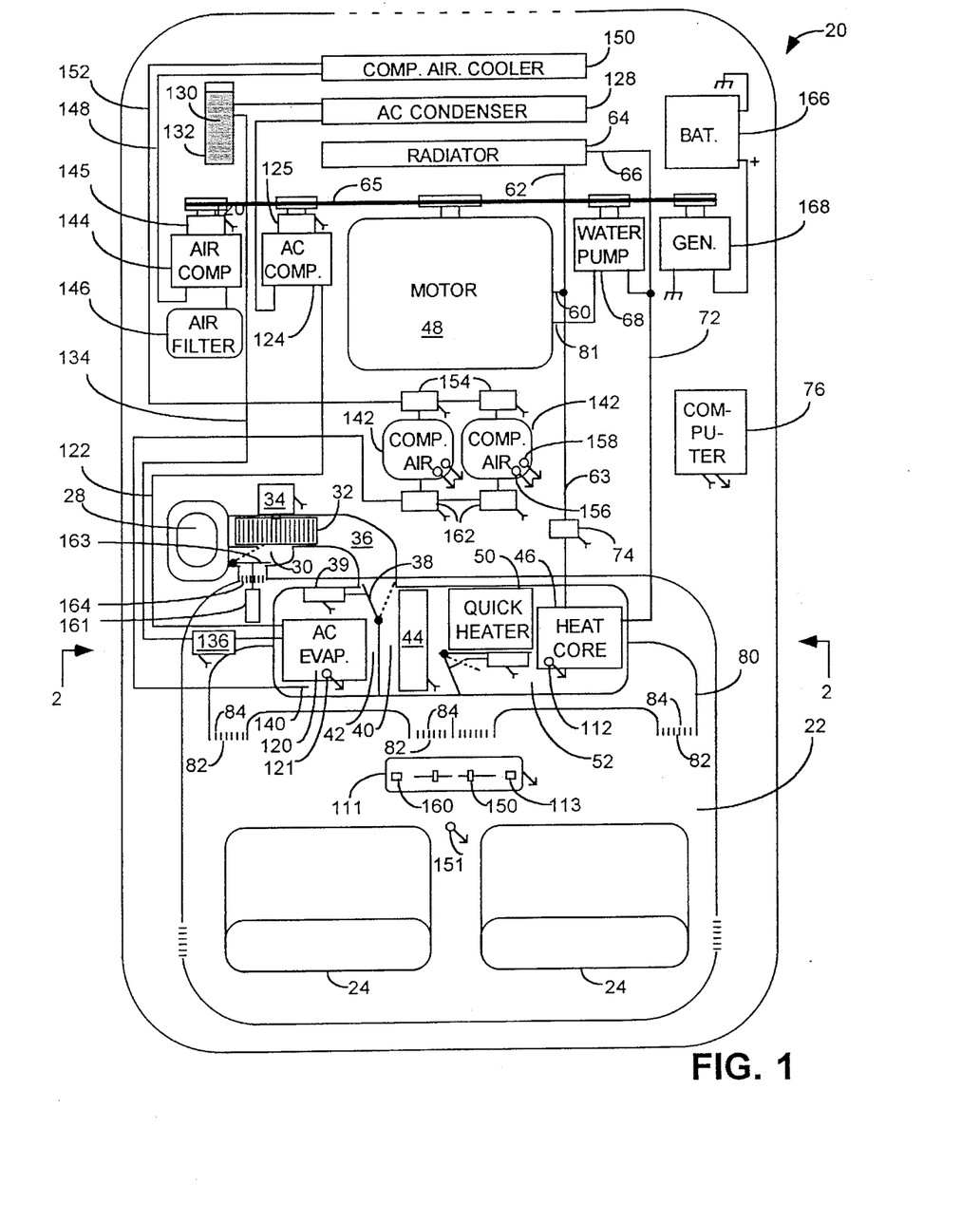
FIG. 1 is a simplified schematic representation of an automotive vehicle made according to one embodiment of the present invention.

FIG. 1 is a highly simplified schematic representation of an automotive vehicle 20 embodying the present invention. For purposes of simplification, substantially the only component of the vehicle 20 which are shown in FIG. 1 are those relating to the automotive vehicle's ventilation system, although it is to be understood that the vehicle includes other components which are typical of an automotive vehicles, such as a frame, wheels, a transmission system, a steering system, etc.

The vehicle 20, which could be a car, a jeep, a truck, or any other type of automotive vehicle, has; a passenger compartment 22 in which one or more passengers (not shown) can ride, such as by seating on seats 24. It includes a ventilation system for controlling the flow and temperature of air in the passenger compartment. As is common in automotive ventilation systems, the ventilation system of the vehicle 20 includes an air intake 28 which is positioned to receive air which passes in through a grill (not shown) which run in front of, and parallel to, the base of the vehicle's windshield (also not shown).

Air entering the air intake 28 passes through an air passage way 30 to a fan 32, powered by a motor 34, and then into a passage way 36 which leads to an air valve formed by an electrically operable door 38. In the preferred embodiment the fan 32 and the electric actuator 39 which operates the door 38 are operated under the control of a computer 76 in response to the position of controls on a ventilation control panel 111 shown in the passenger compartment 22 and in response to various sensors which will be described below.

Figure 2:
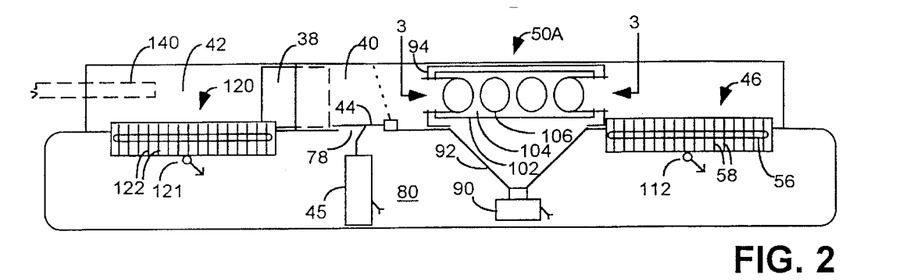
FIG. 2 is a cross section of the simplified ventilation system shown in FIG. 1 taken along the lines 2—2 in FIG. 1 in which the quick heater shown in FIG. 1 is a microwave heater using liquid microwave absorbent material.

The air door 38 is normally in one of two positions, the one shown in solid lines in FIGS. 1 and 2 which directs air to the right into the non-cooling passageway 40, and one shown in dotted lines in FIGS. 1 and 2 which directs air to the lea into the cooling passageway 42.

The non-cooling passageway 40 includes an air valve formed by another air door 44, which is operated by an electric actuator 45, shown in FIG. 2, under control of the computer 76. When the door 44 is in the down position shown in solid lines in FIGS. 1 and 2, the air passing into the non-cooling passageway passes through one of the non-cooling passageway's two heating passageways. Both of these heating passageways lead to the heat core 46, which is heated by waste heat from the vehicle's internal combustion engine 48. One of these heating passageways goes through the quick heater 50 before leading to the heat core 46. The other, passageway 52, leads air to the heat core 46 directly without first passing through the quick heater 50. An air door 54, operated by an electric actuator 55 under control of the computer 76, determines how much of the air which flows through the heat core 46 first passes through the quick heater 50 and how much first passes through the passageway 52.

The heater core 46 is formed of a snaking length of thermally conductive tubing 56 (shown in FIG. 2) carrying heated cooling fluid from the engine 48. Thermally conductive heat fins 58 extend in a direction parallel to the direction of air flow through the heat core. The heated cooling fluid exits the motor 48 through a hot coolant exit 60. From there part of the heated coolant travels through tube 62 to the top of the vehicle's radiator 64, and part of the heated coolant travels through tube 63 to the heat core 46.

Coolant which travels to the radiator 64 is cooled by giving up heat to passing air. Once cooled, this coolant is pumped from the bottom of the radiator through tube 66 into the input port of a water pump 68. The water pump receives rotary power from the engine 48 by means of a belt 65. The water pump pumps the cooled coolant into the engine 48 through a cooled coolant port 81, from which it travels through the engine removing unwanted heat, only to again exit the motor through the hot coolant port 60.

That part of the heated coolant which exits the engine and travels through tube 63 to the heat core, passes through the heat core and then back though a return tube 72 to the input of the water pump 68. When the ventilation system passes air through the heat core, the coolant passing through it is cooled by giving off heat to such air. When the ventilation system is not passing air through the heat core a valve 74 is turned off by operation of a computer 76.

Air which passes through the heat core, and is heated by it, passes into an air duct 80 shown in FIGS. 1 and 2. The Duct 80 directs air toward the vents 82 through which it exits into the passenger compartment 22. Each of the vents 82 has louvers 84 which can be shut in varying degrees to control the amount of air which passes through such vent. The duct 80 also carries air to vents (not shown) for defrosting the vehicle's windshield (not shown).

When the air door 44 is in the up position shown in dotted lines in FIG. 2, the air directed into the ventilation system's non-cooling passageway 40 is blocked from passing through either of the two heating passageways which lead to the heat core 46, and is instead lead directly through an opening 78 located below the door 44 into the duct 80 for distribution to the passenger compartment's vents 82 without being heated. Besides being all the way up or all the way down, the door 44 can placed in an number of intermediate positions by its electromechanical actuator 45. This enables the ratio of the air which passes through the heat core before entering the duct 80 to the air which passes directly into the duct 80 without being heated to be varied as a function of height to which the door 44 is raised. This allows the temperature of heated air exiting the ventilation system be varied without requiring a variable control on the temperature of the heat core.

Figure 3:
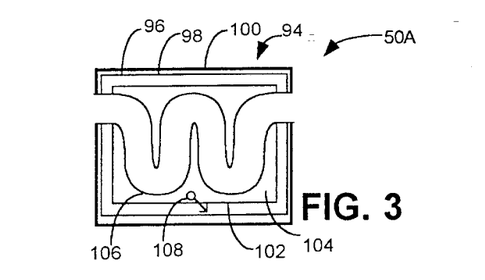
FIG. 3 is a cross section of the simplified quick heater shown in FIG. 2 taken along the lines 3—3 in FIG. 2.

In the embodiment of the invention shown in FIGS. 2 and 3, the quick heater 50 is a microwave powered heater 50A. This heater contains a source of microwave radiation 90 which is controlled by the computer 76 and powered by the battery 166 and/or the generator 168 both shown in FIG. 1. A wave guide 92 is provided for directing the radiation into a microwave reflecting box 94. This box has an inner reflective layer 96 made of a conductive sheet metal or metal foil, placed over an insulating layer 98, covered on the outside by a rigid material 100. Inside the microwave reflecting box 94 is a tank 102 for holding a microwave absorbing liquid 104. The exterior walls of the tank are made of microwave transparent material such as a microwave transparent plastic or glass. The microwave absorbent liquid is a liquid having a sufficiently high dielectric constant to efficiently convert microwave radiation into heat energy. Tap water is sufficient for this purpose, although brine or other liquids are better at absorbing microwave radiation.

A tube 106, designed to function as an air passageway for air passing through the ventilation system to the heat core 46, runs through the tank in a manner so that its sides are surrounded by the microwave absorbent liquid. This is the passageway through which the air directed through the quick heater by the doors 38, 44, and 54 passes. The walls of the tube are made of a relatively thermally conductive material, so that the heat of the liquid can readily be transferred to the air passing the tube. Although not shown, the tank 102 has an attached expansion reservoir located outside the microwave reflective box 94, to enable a portion of the liquid 104 to enter and exit the tank 102 as the liquid contracts and expands as a result of changes in temperature occasioned by turning the microwave radiation on and off.

A temperature sensor 108 is placed in the tank 102 to measure the temperature of the liquid 104. The output of this sensor is fed to the computer 76 and is used by the computer to control the amount of energy supplied to the microwave energy source 90. This is done to insure that the microwaves do not overheat the liquid 104.

When a person in the passenger compartment uses the slider switch 150 to indicate that he or she desires the passenger compartment to be warmer than it is, the computer 76 reads a temperature sensor 112 located near the heat core 46. As long as this sensor indicates that the heat core is cooler than a certain level necessary to quickly provide such an increase in temperature, the computer supplies enough electric energy to the microwave heater to heat the liquid 104, and it causes air doors 38, 44, and 54 to be positioned to direct air into the non-cooling passageway of the ventilation system and then through the quick heater 50. Since the microwave source 90 can start to generate heat almost instantly, and since the amount of liquid in the tank 102 is relatively small compared to the amount of cooling liquid in the vehicle's engine 48, the liquid in the tank 102 can be heated much more quickly than the heat core. Once the vehicle's engine has been running for some time the sensor 112 which detect that the heat core is warm and will tell the computer so. At this time the computer will turn off energy to the microwave source 90 and will move the door 54 to enable air in the non-cooling passageway of the ventilation system to pass though the direct passageway 52 to the heater core, so as to reduce the resistance to air flow caused by the quick heater.

It can be seen that the quick heater allows the vehicles ventilation system to heat air supplied to its passenger compartment before the heat core which is heated by the vehicle's internal combustion engine has a chance to heat up. The quick heater can also be used to increase the rate at which the ventilation system can produce quick heat during the much more brief period in which the heat core warms up after the valve 74 is first turned on after the heat core has been turned off by the closure of valve 74, mentioned above. In fact, the quick heater can be used at any time by pressing a toggle switch 113 on the ventilation control panel 111 when the user desires heat at a greater rate than the heat core alone can provide.

Figure 4:
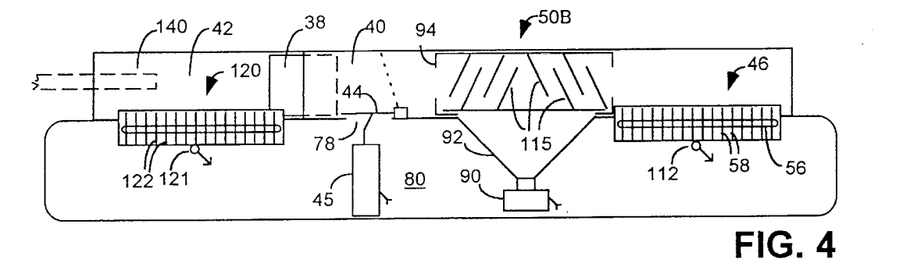
FIG. 4 is a cross section similar to that in FIG. 2, except that, in it, the quick heater is a microwave heater using solid microwave absorbent material.
Figure 5:
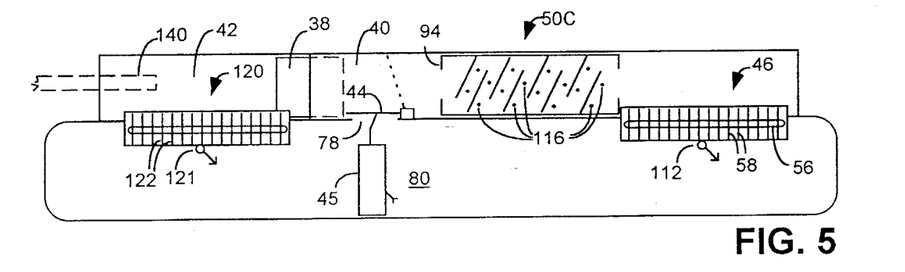
FIG. 5 is a cross section similar to that in FIGS. 2 and 4, except that, in it, the quick heater is an electrical resistance heater.

FIGS. 4 and 5 are cross sections of ventilation systems identical to that shown in FIG. 2, except that they have different embodiments of the quick heater than that shown in FIGS. 2 and 3.

FIG. 4 shown an embodiment 50B of the quick heater. This embodiment includes a microwave radiation source 90, a microwave wave guide 92, and a microwave reflecting box 94, like those shown in FIGS. 2 and 3. But it differs from the quick heater shown in FIGS. 2 and 3 in that it has no tank 102 and no liquid microwave absorbing material 104. Instead it includes a series of vanes 115 made of a solid microwave absorbing material, such as glass impregnated with tin oxide, or any other material having a sufficiently high dielectric constant for absorbing microwave energy and converting it into heat. The vanes 112 are positioned to increase their absorption of microwave radiation and to increase the transfer of heat from them to the air flowing through the quick heater.

FIG. 5 shows a quick heater 50C which uses electrical resistance to heat air rather than microwaves. In it wires 116, somewhat similar to the wires used to heat air in electric hair dryers, are supplied with electrical current under control of the computer 76 to generate heat for the purpose of heating air which passes through the quick heater.

Returning now to FIG. 1, if the air door 38 is placed in the position shown in dotted lines in that figure, the air passing through the ventilation system will enter the cooling passageway 42 of that system As is indicated by arrows in FIG. 2, air entering this passageway passes between the fins 122 of the evaporator 120 of the vehicle's air conditioning system, which tends to cool that air, before passing into the duct 80 and out into the passenger compartment.

The evaporator 120 is part of a traditional automotive air conditioning system. Besides the evaporator 120, this system includes refrigerant line 122 for carrying refrigerant gas evaporated by the heat absorbed from cooled air. The line 122 carries this refrigerant gas to the air conditioning compressor 124. The compressor 124 compresses the refrigerant gas into a hotter, higher pressure gas. A line 126 carries this gas to the input of the air conditioning condenser 128, which looks like an automotive radiator. There air entering the front of the vehicle cools the thermally conductive fins of the condenser, cooling the heated, high pressure refrigerant inside the condenser, causing the refrigerant to condense into a high pressure liquid 130 which is shown in a reservoir tank 132. A tube 134 carries this liquid high pressure refrigerant to an expansion valve 136, which release the liquid refrigerant at a lower pressure into the evaporator 120 where it can evaporate, absorbing heat, at a temperature below room temperature. The air conditioning compressor 124 contains an electrically operable clutch 125 which operates under computer control to selectively disconnect the rotational motion supplied by the belt 65 to the compressor 124 when air conditioning is not on.

A novel aspect of the cooling system of the vehicle 20 is its use of compressed air to provide rapid cooling. The cooling passageway 42, in addition to including the air conditioning evaporator 120, includes a tube 140 leading from one of two compressed air tanks 142. When compressed air is let out of the tanks 142 and allowed to enter the cooling passageway 42 it expands, drop down to normal atmospheric pressure, and cools almost instantly, lowering the temperature of the air flowing into the duct 80 and out into the vehicle's passenger compartment 22. The drop in temperature results because allowing a gas to expand freely causes its temperature to drop.

The compressed air in tanks 142 is provided by an air compressor 144 shown in FIG. 1, which is preferably located under the vehicle's hood (not shown). The air compressor 144 takes in air through an air filter 146 to prevent dirt from clogging it. The compressor preferably compresses the air to approximately six times atmospheric pressure. The process of compressing the air also heats it. The heated compressed air produced at the output of the air compressor 144 is carried by a thermally conductive high pressure 148 line to a compressed air cooler 150 which contains thermally conductive metal fins for helping transfer the heat in the compressed air into surrounding air. Although not shown, the compressed air cooler has a trap at its bottom for collecting and allowing the selective release of water which condenses out of the compressed air when it is cooled in the cooler 150. After passing through the compressed air cooler 150, the cooled compressed air travels through a high pressure tube 152 to one of two computer controlled valves 154. Each compressed air tank includes a pressure sensor 156 and a temperature sensor 158. Normally the computer 76 causes air to be supplied to that of the two air tanks 142 with the lowest air pressure. The use of two tanks allows one tank to be charged with pressurized air while the other tank is being used. Once both tank have been brought up to full pressure, such as six times atmospheric pressure, the computer cause an electrically controllable clutch 145 to mechanically disconnect the air compressor 144 from the belt 65 driven by the engine 48, turning the air compressor off.

When a passenger in the passenger compartment 22 presses a button 160 on the temperature control panel 111, the computer 76 selects the compressed air tank 142 having the highest air pressure and causes the valve 162 between that tank and the line 140 to be opened. This causes the air stored in the tank to be released into the ventilation systems cooling passageway 42 as long as the button 160 is being pushed. Because the pressure of the released air drops down to one atmosphere, it cools. This cool air then passes through the fins 122 of the air condition's evaporator along with other air passing through the ventilation system. From there it passes into the duct 80 and out into the passenger compartment, where it can provide cooling comfort to the vehicle's passengers.

It should be noted that the valves 162 will also be opened to release air pressure in the tanks 142 when either of them exceeds a given pressure. This is done for safety reasons, that is, to prevent possible explosion of the air tanks which might result if the pressure in the tanks were to rise above a safe level, such as due to an increase in temperature of the tanks.

The button 160 is a manual control button that causes compressed air to be released as long as the passenger presses it. Compressed air can also be released automatically as a function of the setting of the thermostatic slider control 150 and the readings produced by several air temperature sensors.

If the temperature set on the slider control 150 is below that in the passenger compartment by more than a specified amount the computer 76 will automatically cause a release of air until the temperature indicated in the slider control 150 equals that sensed by an air temperature sensor 151 located in the passenger compartment, at which time it will turn off the release of the air. If the sensor 121 located near the air conditioning evaporator indicates that the air conditioner evaporator is cold enough to maintain the temperature set on the control 150, or to reach that temperature quickly, by itself, the computer will turn off the release of compressed air.

The quick cooling made possible by the release of compressed air is very impressive. For example, if 0.5 cubic feet of air which had been compressed at six atmospheres (approximately ninety pounds per square inch) the release of that air into a passenger compartment having a volume of approximately sixty-cubic feet (the approximate volume of air the passenger compartment of a small four passenger car), the cooling due to the expansion of such compressed gas would be enough to cool the sixty-cubic feet of air from ninety degrees to seventy degrees within seconds. This can be shown by the following calculations. Equation 1 shows the formula relating pressure and volume for adiabatic expansion of gas in which there is no addition of heat to the system.

$$P_1 V_1^\gamma = P_2 V_1^\gamma \qquad \text{Eq. 1}$$

where P refers to initial and final pressures, V refers to initial and final temperatures, and γ refers to the specific heat of the gas. For air, which is largely diatomic nitrogen and oxygen the value of γ is 1.4. Since $P_1=6$, $V_1=0.5$, $P_2=1$, then $V_2=1.8$ cubic feet. Since it is well known that $$P_1 V_1 / T_1 = P_2 V_2 / T_2 \qquad \text{Eq. 2}$$

the temperature of the released air, $T_2=182.9$ degrees K. However, as the air is released, it will mix with the sixty cubic feet of air already in the car. Since, in our example, the compressed air was originally 0.5 cubic feet of compressed air at six atmospheres of pressure, it will expand to 3 parts of air at 182.9 degrees K., and will mix with the sixty parts of air at 305 degrees K. assumed to be in the passenger compartment in our example. Therefore the resulting temperature in the passenger compartment will be approximately 290.4 degrees K., or approximately seventy degrees Fahrenheit. Using the above formulas it can be seen that the amount of compressed air compressed at a given pressure to drop the temperature of the air in a given sized passenger compartment from one specific temperature to another can be quickly calculated. Preferably the tanks 142 in the preferred embodiment will store enough compressed air at a sufficient pressure to lower their car's passenger compartment from approximately 120 to 70 degrees Fahrenheit.

As is shown in FIG. 1, the passageway 30 near the ventilation systems air intake 28 has an air door 163, operated by an electric actuator under computer control which can be moved to the dotted position to connect the passageway 30 to an air recycling vent 164 from the passenger compartment 22. When the air door 163 is in the dotted position most of the air passing through the ventilation system comes from the passenger compartment rather than from the outside. The air door is often set in this position when the air in the passenger compartment is being cooled to reduce the amount of energy required to keep that air cool. The door 163 always allows a certain amount of air to enter from the outside to provide the occupants of the passenger compartment with fresh air.

Figure 6:
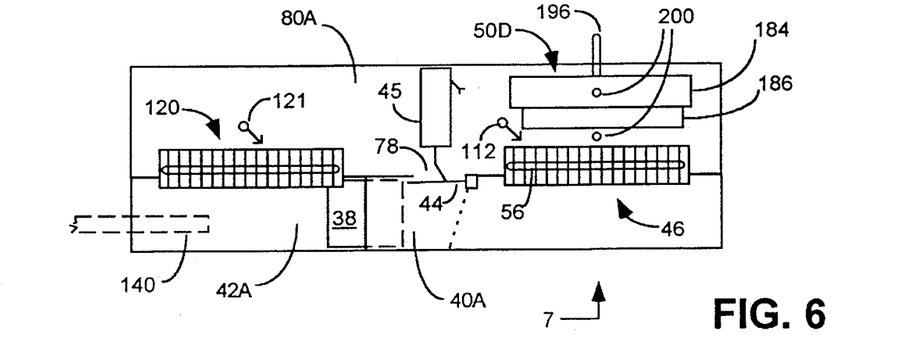
FIG. 6 is a schematic cross section of a portion of a ventilation system, which is similar to that shown in FIGS. 2, 4, and 5, except that in it air enters in the bottom and exits from the top, rather than the opposite as in FIGS. 2, 4 and 5, and except that its quick heater uses chemicals and water to generate heat and is located over its heat core.
Figure 7:
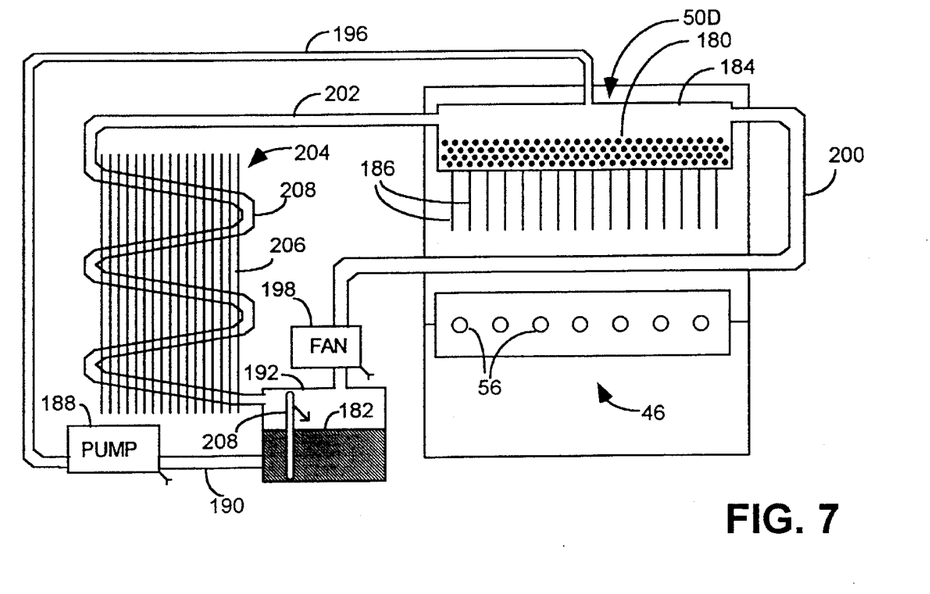
FIG. 7 is a schematic cross section of the portion of the ventilation system shown in FIG. 6 taken along lines 7—7 in FIG. 6, which also includes the water and air circulation system used with the chemical quick heater.

FIGS. 6 and 7 show another embodiment of the invention in which the quick heater is a chemical quick heater 50D which generates heat by means of a chemical reaction. Although many chemical reactions can be used to generate quick heat, the embodiment shown in FIGS. 6 and 7 generates heat by submersing a chemical, such as the lithium carbonate ($Li_2Co_3$) 180 shown in FIG. 7, in water 182. Lithium carbonate has the advantage of being reusable. It generates heat each time water is applied to it when it is dry, and it can be dryed by being heated. When the ventilation system's heat core is cold the lithium carbonate can supply quick heat by being wetted, and then, when the heat core becomes hot, it can absorb thermal energy from the heat core to become dry again and ready for another use.

FIG. 5 shows a cross section of a portion of a ventilation system similar to the cross sections shown in FIGS. 2, 4, and 5, except that, in it, air enters in the bottom and exits from the top. In FIG. 6 air blown by motion of the vehicle or its ventilation fan enters the air door 38 in the bottom level of the ventilation box. This bottom level is comprised of a non-heating passageway 40A and a cooling passageway 42A. When the computer controlled air door 38 is in the position shown in dotted lines in FIG. 6, the air entering the ventilation box is directed to the cooling passageway 42A. There it is cooled by the air conditioning evaporator 120 or the release of air from tube 140, or both, in a manner similar to that described above. When the air door 38 is in the position show in solid lines in FIG. 6, air is directed to the non-cooling pathway 40A. The path the air takes from there is controlled by the position of the computer controlled air door 44. When floor 44 is in the position shown in dotted lines in FIG. 6. it forces air through the opening 78 directly into the ventilation duct 80A without first being heated. When door 44 is in the position shown in solid lines in FIG. 6, it forces the air to pass through the heat core 46, causing it to be heated if the heat core has had time to become hot.

In the ventilation system of FIG. 6, a chemical quick heater 50D is mounted above the heat core 46. It includes a conductive box 184 which contains the Lithium Carbonate 180, for example, in a powder form. Heat conducting fins 186 are connected to the box to help conduct thermal energy to and from air surrounding the chemical box 184.

When quick heat is desired a computer controlled pump 188 pumps water 182 in through a pipe 190 from a tank 192 and out though a pipe 196 into the box 184 containing the Lithium Carbonate 180. When wetted, the Lithium Carbonate chemically reacts with the water and releases heat instantly. This heat is conducted out of the box 184 and the fins 186 into the air passing though the heat core 46 into the ventilation duct 80A. The amount of water supplied to the box 184 can be controlled by a computer 76, like that shown in FIG. 1, as a function of the amount of heat requested on a ventilation control panel 111, like that shown in FIG. 1, and the temperature sensed by a sensor 112.

Once, the heat core gets hot, the computer 76 stops pump 188 from supplying further water to the box 184, turning off the quick heater. At this time the air heated by the heat core supplies thermal energy to the box 184 through the fins 186, and this thermal energy causes the water which has combined with the Lithium Carbonate to separate from it and evaporate into water vapor. At this time the computer 76 turns on a fan 198, which blows air through a pipe 200 into the chemical box 184. The resulting air pressure in box 184 causes heated air containing water which has evaporated from the Lithium Carbonate to pass through a pipe 202 into a condenser 204. This condensor includes heat conducting fins 206 and a snaking length of conductive pipe which passes through the fins. This condensor is preferably placed in a location in which it will be efficiently cooled by outside air. The purpose of the condenser is to cool the vapor laden air exiting the chemical box 184 and to cause the water vapor in that air to condense and fall down into the tank 192. This makes the water which has been mixed with the Lithium Carbonate available for use the next time quick heat is needed and it make the air circulated through the, fan 198 and pipe 200 into the box 184 dry, so it can remove remaining water from the Lithium Carbonate. As long as the vehicle continues to run, the computer 76 causes the fan 198 to run until a water level indicator 208 in the water tank 192 indicates that the water level in the tank in no longer increasing, indicating that all the water has been removed from the chemical box 184.

It should be understood that the forgoing descriptions and drawings are given merely to explain and illustrate the invention and that the invention is not to be limited thereto, except in so far as the interpretation of the appended claims are so limited. Those skilled in the, art who have the disclosure before them will be able to make modifications and variations therein without departing from the scope of the invention.

For example, it should be understood in other embodiments of the invention the automotive vehicle could have an-electric engine instead of an internal combustion engine. In such an embodiment, the quick heater, such as a microwave heater of the general types described above, might be the only heater used because most electric engines are not water cooled, and thus could not heat a traditional heat core like the heat core 46 described above.

It should be understood that the positioning of the air passageways in the ventilation systems shown have been simplified for purposes of presentation, and the in actual embodiments ventilation elements and passageways could be arranged differently. Also, it should be understood that in other embodiments different combinations and arrangements of the ventilation elements shown could be used. For example, it would be possible in other arrangements to not have the air which passes through the quick heater 50 pass through the heat core 46, as it does in FIGS. 1, 2, and 4–5, but instead pass directly to the air duct 80 and have an air door which directs air to the quick heater or to the heat core, depending on which is currently heating. Similarly it would be possible to make a ventilation system which has heating components, but not cooling ones, and another which has cooling components, but no heating ones.

It should also be understood that in other embodiments of the invention the air compressor used for the compressed air quick cooling system could be powered by an electric motor powered by the vehicle's battery 166 or its generator 168. In other embodiments of the invention the compressed air cooler 150 could be done away with. This is because the compressed air will normally only be used when a car is first started up after not having been used for some time. In this situation, even if the heated compressed air produced by the air compressor 144 was hot when it entered one of the air tanks 142, it will normally have had time to cool in that tank before being used when a car is first started up for the purpose of cooling the passenger compartment. To aid in such cooling the air tank 142 could have heat conducting cooling fins on it, or it could be cooled by the engine's cooling system.

It should be understood that in other embodiments of the invention more than one belt could be used to convey rotational motion from the vehicle's engine to its generator, water pump, air conditioning compressor, and air compressor.

In other embodiments of the invention the air doors could be activated mechanically, or by means other than computer controlled electric actuators as described above. Furthermore, it should be understood that many of the control functions described as being performed by a computer in the preferred embodiment described above could be performed by mechanical or discrete logical controls in other embodiments.

It should be understood that in other embodiments of the invention other types of quick heaters could be used. For example a quick heater could be made which generated heat by burning gasoline, similar to the gasoline heater which were common in Volksvagen "Beatles".

Accordingly, the invention is not to be limited to the specific embodiments illustrated and described, and the true scope and spirit of the invention are to be determined by reference to the following claims.

What is claimed is:

1. An automotive vehicle comprising:

a passenger compartment;

an air compressor;

means for powering the air compressor;

a compressed air tank for storing air compressed by the air compressor;

means for selectively releasing compressed air from said tank into said passenger compartment to cool the passenger compartment; and an air conditioning system which includes:
    refrigerant;
    a coolant compressor for compressing said refrigerant which has been evaporated into a higher pressure evaporated fluid;
    a condenser for cooling the higher pressure evaporated refrigerant so that it condenses into liquid; and
    an evaporator in which the liquid refrigerant can absorb heat by evaporating into said evaporated refrigerant.

2. An automotive vehicle as in claim 1 further including a ventilation system which includes air passageways and a fan for blowing air through said air passageways into said passenger compartment; and said means for selectively releasing compressed air selectively releases said compressed air into said air passageways.

3. An automotive vehicle as in claim 1 wherein:

said automotive vehicle includes a motor;

said air compressor is powered by mechanical energy from said motor.

4. An automotive vehicle as in claim 1:

further including a sensor for determining when the evaporator of said air conditioning system is capable of performing a certain degree of cooling; and wherein said means for selectively releasing compressed air includes means for responding to determination by said sensor that said air conditioning system's evaporator is capable of performing said certain degree of cooling by shutting off said release of compressed air.

5. An automotive vehicle as in claim 1 further including:

a conduit for carrying compressed air from said air compressor to said compressed air tank; and a radiator device having thermally conductive fins located in the conduit between said air compressor and said compressed air tank to facilitate the transfer of heat away from said compressed air after it is compressed and before it enters said compressed air tank.

6. An automotive vehicle as in claim 1 wherein said means for selectively releasing compressed air from said tank into said passenger compartment includes human operable controls located in said passenger compartment for enabling an occupant of the passenger compartment to selectively cause the release of said compressed air.

7. An automotive vehicle as in claim 1 further including:

a sensor for detecting the air pressure in said compressed air tank; and means for turning said air compressor on and off as a function of the air pressure detected by said sensor.

8. An automotive vehicle as in claim 1:

wherein there are a plurality of compressed air tanks for storing air compressed by the air compressor;

further including means for supplying compressed air from said compressor to a selected one said compressed air tanks; and wherein said means for selectively releasing compressed air includes means for releasing air from a selected one of said compressed air tanks.

9. An automotive vehicle as in claim 1:

further including a temperature sensor for sensing the temperature of air; and wherein said means for selectively releasing compressed air from said tank into said passenger compartment includes means for stopping the release of said compressed air when said temperature sensor detects an air temperature below a given level.

10. An automotive vehicle comprising:

a passenger compartment;

an air compressor;

means for powering the air compressor;

a compressed air tank for storing air compressed by the air compressor;

means for selectively releasing compressed air from said tank into said passenger compartment to cool the passenger compartment;

a fluid loop including:

cooling fluid;

means for causing said cooling fluid to be compressed;

a first heat exchanger for enabling cooling fluid in said loop which has been compressed to give off heat;

means for letting compressed cooling fluid which has given off heat in said first heat exchanger to expand at a reduced pressure;

a second heat exchanger for enabling said expanded cooling fluid to absorb heat from air;

means for supplying cooling fluid which has passed through said second heat exchanger to said means for causing said cooling fluid to be compressed; and means for pushing air through said second heat exchanger and into said passenger compartment.

11. An automotive vehicle as in claim 10, wherein said cooling fluid is condensed and then evaporated in said fluid loop.

* * * * *